Aug. 2, 1927.
E. R. BURTNETT
1,637,519
CYLINDER HEAD FOR SLEEVE VALVE INTERNAL COMBUSTION ENGINES
Filed Nov. 30, 1926    2 Sheets-Sheet 1
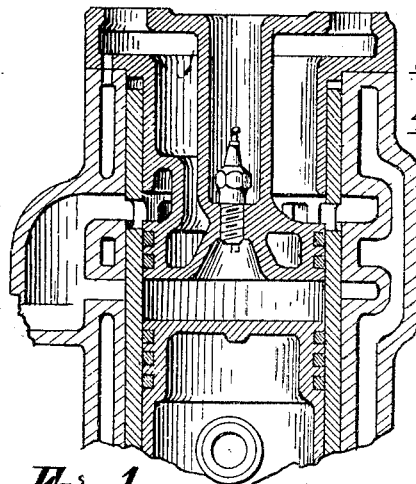
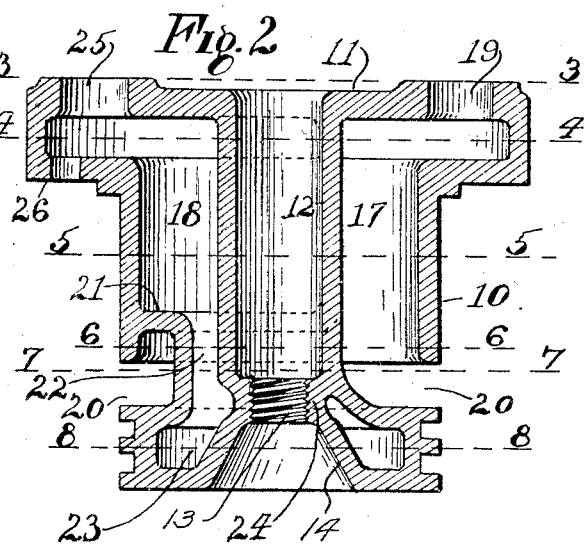
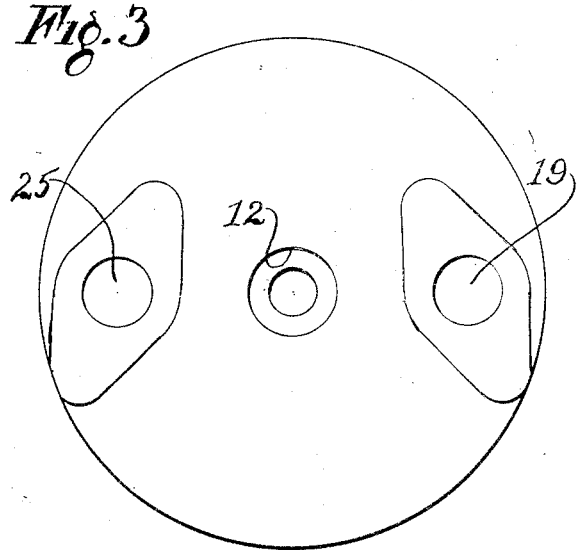
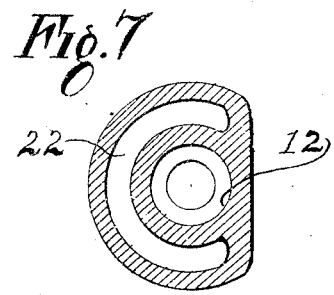
Everett R. Burtnett
INVENTOR Aug. 2, 1927. 1,637,519
E. R. BURTNETT
CYLINDER HEAD FOR SLEEVE VALVE INTERNAL COMBUSTION ENGINES
Filed Nov. 30, 1926  2 Sheets-Sheet 2
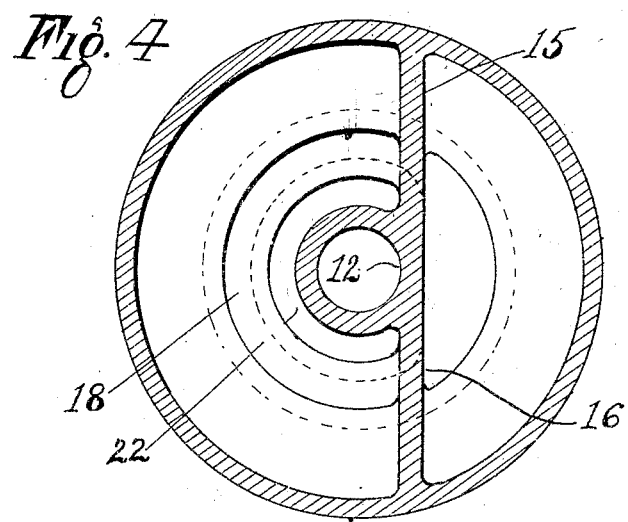
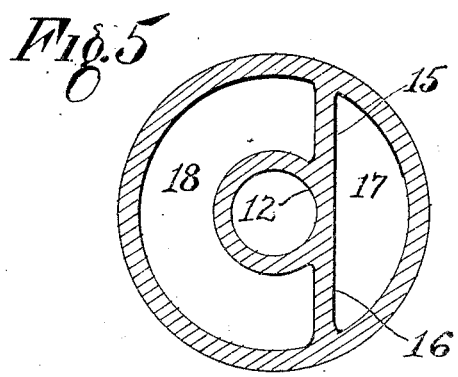
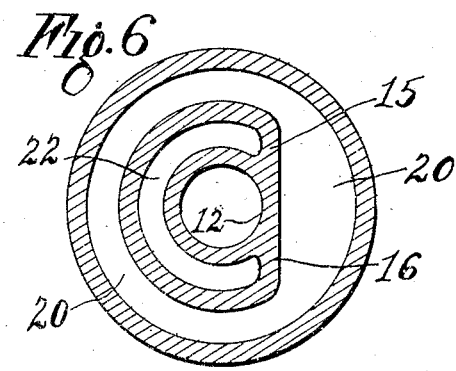
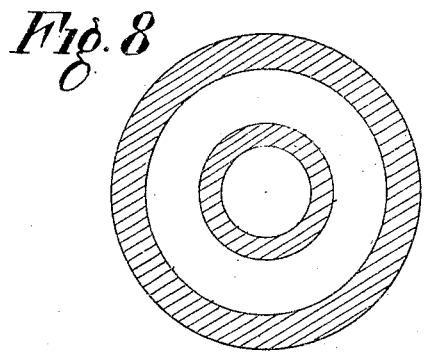
Everett R Burtnett
INVENTOR Patented Aug. 2, 1927.

1,637,519

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION OF NEVADA.

CYLINDER HEAD FOR SLEEVE-VALVE INTERNAL-COMBUSTION ENGINES.

Application filed November 30, 1926. Serial No. 151,645.

My invention relates to improvements in cylinder heads for sleeve valve internal combustion engines of the general type disclosed in my co-pending U. S. patent application Serial Number 146,606, filed Nov. 6, 1926, the principal object of my invention being to provide a cylinder head for sleeve valve engines in which the sleeve is arranged to operate in a telescopic manner over the periphery of the cylinder head and to provide means of establishing a fresh fuel charge passage communication to the periphery of the cylinder head through the cylinder head to facilitate the sleeve valve normally employed as an inlet and exhaust valve to a combustion chamber being adapted to the additional function of providing inlet valve and cutoff means for the admission of fresh charge to a fresh charge pumping device of whatever suitable type may be employed in the operation of a two stroke cycle engine. An illustration of the piston type pumping chamber is shown and the method of co-functional relationship described in my co-pending U. S. patent application heretofore identified by serial number and filing date.

A further object of my invention being to provide in the cylinder head a cooling fluid cell, the interior of the cylinder head having partitions forming the cooling fluid cell and the fresh fuel charge passage, and to extend the fresh fuel charge passage radially at its innermost point opening through the periphery of the cylinder head with annular form about the entire circumference of the head, providing thereby the greatest possible opening area for a corresponding sleeve valve port registration of a given sleeve valve stroke and port registration time duration.

A further object is to provide an inlet opening in communication with the fresh fuel charge passage of the cylinder head at the outer end, at which point a source of fuel charge supply may be easily attached, in addition, the opening to cooling fluid cell formed in the cylinder head is formed at the outer end of the cylinder head in the same plane as the opening of the fresh fuel charge passage, facilitating the machining of the two openings by one operation. My improvements are effective in greatly simplifying the construction and improving the operation of a two stroke cycle engine wherein sleeve valves are undertaken to supply the necessary valve function to admit a fresh fuel charge to a prepumping chamber and transfer the prepumped charge from the prepumping chamber to the combustion chamber.

With the foregoing and other objects in view, my invention consists in certain novel features of construction which will be hereinafter more fully described and claimed and illustrated in the accompanying drawings, in which:

Fig. 1 is a vertical section taken through a cylinder having a sleeve valve adapted to operate with the features of my improved cylinder head.

Fig. 2 is a vertical section taken through the center of my improved cylinder head construction.

Fig. 3 is a horizontal plan view taken on the line 3—3 of Fig. 2;

Fig. 4 is a horizontal section taken on the line 4—4 of Fig. 2;

Fig. 5 is a horizontal section taken on the line 5—5 of Fig. 2;

Fig. 6 is a horizontal section taken on the line 6—6 of Fig. 2;

Fig. 7 is a horizontal section taken on the line 7—7 of Fig. 2;

Fig. 8 is a horizontal section taken on the line 8—8 of Fig. 2.

Referring by numerals to the accompanying drawings, 10 designates a cylinder head of my improved construction, 11 designates the outward end of the head to which the cooling fluid and fresh charge connections may be attached, a recess 12 is formed in the central part of the head through which a spark plug may be screwed into the threaded aperture 13 formed in a boss 24 located near the end of the head which is adapted to depend within the sleeve cylinder of the engine, a recess 14 is formed in the end face of the cylinder head adapted to form the head end enclosure to the combustion chamber, this slight recess is designed to facilitate a more localized strata of undiluted fresh gaseous mixture being compressed adjacent the sparking terminals at the time of ignition.

Partitions 15 and 16 join the outside shell of the cylinder head through the interior with the wall of the recess 12, dividing the chamber within the cylinder head into two parts, 17 and 18, the partitions are preferably formed to one side of center permitting the cooling fluid to occupy the greater portion of the interior of the head. The chamber developed on the short side the partitions provides a duct 17 for the passage of fresh fuel charge from an opening 19 located at the top and accessible to exterior accessory connections to an annular formed outlet 20 opening through the periphery of the cylinder head. The annular formed outlet being formed as a radial extension of the fresh charge duct 17. The annular formed outlet 20 opening through the periphery of the head in one plane for the entire circumference of the head. The axis of the plane of the annular opening being at right angle to the axis of the machined periphery of the cylindrical body of the head.

To increase the volume distribution area of the base depth of the annular formed opening 20 to facilitate high volume passage efficiency from the duct part 17 of the fresh charge passage to the annular opening, the crown 21 of the annular formed fresh charge passage is constructed in a plane in a position further headward than the plane of the headward edge of the annular opening of the fresh charge passage through the periphery of the cylinder head. A by-pass cooling fluid cell 22 establishes a cooling fluid cell communication between the cooling fluid cell 18 and a cooling fluid cell 23 formed of the end of the body which forms the combustion chamber head and surrounding the spark plug loss 24 between the recess 12 and the annular fresh fuel charge passage 20.

An opening 25 is provided in the outer face of the head for the circulation of cooling fluid to the cooling fluid cell 18 and its communicative cells 22 and 23. The periphery of the cylinder head is constructed of two diameters, the step 26 being the horizontal face by which the cylinder head is supported on the cylinder in the usual manner. Expansion ring grooves are provided in the periphery of the head adjacent the end forming the head enclosure to the combustion chamber and located between the annular fresh charge opening 20 and the combustion chamber providing, when assembled in the sleeve valve, an expanding seal against the bore of the sleeve valve between the annular opening 20 of the fresh charge passage and the combustion chamber.

Obviously the construction of my improved cylinder head for sleeve valve internal combustion engines as herein shown and described may be varied in certain details without departing from the spirit of the invention, the scope of which is set forth in the appended claims.

I claim as my invention:

1. A cylinder head for sleeve valve internal combustion engines, a hollow formed cylindric body of two diameter periphery, a cylindric wall extending substantially axially with and in the center of the body, a recess formed within the said cylindric wall, the said recess opening through the end of the body having the end periphery of greatest diameter, a threaded aperture opening from the other end of the said recess through the end of the body of least periphery diameter, partitions formed within the hollow interior of the body, the said partitions dividing the interior chamber of the body into a cell and a passage way, the said cell being adapted to contain cooling fluid, the said passage way being adapted to provide a fresh fuel charge passage communication through the head, an opening formed from the said cell through the end of the body having the cylindric periphery of greatest diameter, the said passage way within the body opening through the end of body which end is of greatest diameter and the said passageway opening through the periphery of the body of least diameter.

2. A cylinder head of cylindrical form, having a cylindric end abutment of one diameter and a flange end of greater diameter, openings formed through the said flange end, an annular opening formed through the periphery of the cylindric abutment, a passage formed through the interior of the head, the said passage being in communication with the said annular opening in the periphery and one of the said openings formed through the said flange end, a cooling fluid cell formed within the head and the said cooling fluid cell being in communication with an opening in the flange end of the head.

3. A cylinder head of two-diameter cylindric periphery adapted to a sleeve valve two stroke cycle internal combustion engines having a gaseous mixture fresh charge supply passage formed within the head, the said gaseous mixture fresh charge supply passage having one opening through the end of the cylinder head, the said end of the head having the greatest diameter and a second opening through the side of the head the periphery of which is of least diameter, the said gaseous mixture passage opening in the side of the said head being of annular form in one plane at right angle to the axis of the cylindrical body of the cylinder head a cooling fluid cell formed within the said head, and an ignition device aperture formed in the head.

In testimony whereof I affix my signature.

EVERETT R. BURTNETT.